US008286431B2

(12) United States Patent
Briesch et al.

(10) Patent No.: US 8,286,431 B2
(45) Date of Patent: Oct. 16, 2012

(54) COMBINED CYCLE POWER PLANT INCLUDING A REFRIGERATION CYCLE

(75) Inventors: Michael S. Briesch, Orlando, FL (US); Keith B. McLaurin, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 329 days.

(21) Appl. No.: 12/579,586

(22) Filed: Oct. 15, 2009

(65) Prior Publication Data

US 2011/0088399 A1    Apr. 21, 2011

(51) Int. Cl.
  *F02C 1/00*   (2006.01)
(52) U.S. Cl. ...................................... 60/728; 60/39.182
(58) Field of Classification Search .................... 60/728, 60/39.182, 39.5, 39.511, 773
  See application file for complete search history.

(56) References Cited

U.S. PATENT DOCUMENTS

| | | | |
|---|---|---|---|
| 3,788,066 A * | 1/1974 | Nebgen ............................ 60/775 |
| 5,321,944 A * | 6/1994 | Bronicki et al. ................. 60/775 |
| 5,457,951 A * | 10/1995 | Johnson et al. .................. 60/780 |
| 5,724,807 A * | 3/1998 | Schuetzenduebel et al. ........................... 60/39.464 |
| 5,758,502 A * | 6/1998 | Utamura et al. ................. 60/728 |
| 6,058,695 A | 5/2000 | Ranasinghe et al. |
| 6,173,563 B1 | 1/2001 | Vakil et al. |
| 6,457,315 B1 | 10/2002 | Lee et al. |
| 6,484,506 B1 * | 11/2002 | Bellac et al. ..................... 60/772 |
| 6,615,585 B2 * | 9/2003 | Tsuji ................................ 60/728 |
| 6,651,443 B1 * | 11/2003 | Meckler .......................... 60/783 |
| 6,694,772 B2 | 2/2004 | Inoue et al. |
| 6,739,119 B2 * | 5/2004 | Erickson ...................... 60/39.53 |
| 7,343,746 B2 * | 3/2008 | Pierson ............................ 60/772 |
| 2006/0037337 A1 | 2/2006 | Lear, Jr. et al. |
| 2010/0293973 A1 * | 11/2010 | Erickson ......................... 62/101 |

OTHER PUBLICATIONS

Stoecker and Jones; "Absorption Refrigeration"; Refrigeration and Air Conditioning; 1982; pp. 328-350; $2^{nd}$ Edition; McGraw-Hill Publishing Co.; U.S.

Minton; "Thermal Compression"; Handbook of Evaporation Technology; 1986; pp. 176-185; Unknown volume—issue No.; William Andrew Publishing/Noyes Publications; Unknown city/country published.

\* cited by examiner

*Primary Examiner* — Phutthiwat Wongwian

(57) ABSTRACT

A method and system for augmenting the output of a combined cycle power plant having a gas turbine driving a generator, a heat recovery steam generator that recovers exhaust heat from the gas turbine to drive a steam turbine also driving a generator, and a refrigeration element that is powered by available energy in steam exhausted from the steam turbine to cool water. The refrigeration element employs a substantially closed cycle refrigeration system that is either an absorption chilling system or a thermal compression chilling system. The refrigeration element provides cool water to an inlet chiller arranged to chill inlet to the gas turbine to augment the power output of the gas turbine and the water is recirculated to be chilled and used again. Since the refrigeration cycle is substantially closed, little or no additional plant water consumption is imposed on the power plant.

19 Claims, 3 Drawing Sheets

COMBINED CYCLE POWER PLANT INCLUDING A REFRIGERATION CYCLE

TECHNICAL FIELD

This disclosure relates generally to electric power generation and more specifically to combined cycle power plants having a gas turbine, a steam turbine, and a refrigeration cycle for cooling inlet air to the gas turbine to augment output.

BACKGROUND

Combined cycle power plants are known in the art as an efficient means for converting fossil fuels to thermal, mechanical, and/or electrical energy. Combined cycle power plants are known to include a gas portion and a steam portion. Thermodynamically, the gas portion operates as a Brayton cycle and the steam portion operates as a Rankine cycle. The gas portion, or topping cycle, includes a gas turbine engine powered by the combustion of a fuel such as natural gas or fuel oil. A steam turbine of the steam portion, or bottoming cycle, is powered by steam that is generated by the cooling of the gas turbine exhaust in a heat recovery steam generator (HRSG). The HRSG is a heat exchange device that uses the hot exhaust from the topping cycle to generate steam for use in the bottoming cycle. In the combined cycle power plant, the bottoming cycle recovers waste heat from the topping cycle to generate electricity and/or mechanical energy. The steam portion includes an air cooled condenser for converting expanded steam exhausted from the steam turbine into condensate, which is returned to the HRSG for reheating and use in the cycle once again. When converting the expanded steam to condensate, combined cycle power plants can reject a large percentage of heat input as waste heat with nearly 80% of the heat rejection occurring in the condenser of the steam portion. For example, expanded steam can be exhausted from a super-atmospheric steam turbine to the condenser at 16 psia and 220° F. and returned to the HRSG at a sub-atmospheric pressure and reduced temperature. The pressure drop and reduction in temperature are recognized as a source of energy presently unused in combined cycle power plants.

Various technologies have been employed to augment the power output that the gas turbine is able to produce. One technique is to cool the gas turbine inlet air prior to compressing it in the compressor, which increases the turbine's efficiency. Cooling causes the inlet air to have a higher density, thereby creating a higher mass flow rate through the gas turbine. The higher the mass flow rate through the gas turbine, the more power the gas turbine can produce. Evaporative cooling is one method of cooling the gas turbine inlet air.

Evaporative cooling is a technique that has been used for cooling and has been designed for and installed with new power generators, most commonly in the Southwestern United States. Ambient air drawn in from outside transfers heat (i.e., heat of vaporization) to cooler water circulating through a media and, as a result, the temperature of the air is lowered in a process referred to as adiabatic saturation. Because of the still widely held view that evaporative cooling is of little benefit in geographic regions subject to damp weather or high humidity conditions, its use to date has been mainly restricted to providing supplemental cooling for generators located in arid regions, such as the Southwestern United States. The term "arid" used throughout this application is understood to refer to environments having an ambient relative humidity less than about 60% and an ambient temperature greater than about 85° F.

Water or steam injection is yet another method that can be used for power augmentation of the gas turbine. Water injection or steam injection within the combustion chamber, or water added at the compressor inlet when the gas turbine is operating under full load, will increase the power output of a gas turbine above the normal output. As with evaporative cooling, water or steam injection creates a higher mass flow through the gas turbine. This is because mass is added to the flow as steam or water, and the increased power output is the direct result of the increased mass flow. However, the water consumed both by evaporative cooling and steam injection techniques is not recovered and typically is rejected directly to the environment. While this may be acceptable where water is in ample supply, it is an increasing problem in arid or other regions where water is in short supply and is accordingly a valuable commodity. Waste of water in such regions is environmentally irresponsible. Further, the cost of water used in evaporative cooling and steam injection techniques for augmenting electrical output can be significant, and it is becoming increasingly difficult in some areas to obtain a permit to use water for power generation, especially in dry and arid regions.

Accordingly, a need exists for a combined cycle power plant that efficiently augments power output through inlet air cooling without an increase in consumption of plant water. Also, there is a need for a combined cycle power plant that advantageously recovers and uses rejected heat in the bottoming cycle of the combined cycle system.

SUMMARY

Briefly described, the invention comprises a triple cycle power plant, comprising a combustion turbine element, a steam turbine element, and a substantially closed cycle refrigeration element. An inlet chiller is associated with a combustion turbine inlet and cools inlet air entering the combustion turbine by passing the air through a heat exchanger through which chilled water is circulated. As the inlet air cools, the air becomes more dense, which causes a greater mass flow through the combustion turbine system, which in turn produces a greater power output. The combustion turbine moves air through the engine, compressing the inlet air, mixing the compressed inlet air with a fuel, combusting the compressed air-fuel mixture, and expanding the combusted mixture through a turbine with combustion gas being exhausted to a heat recovery steam generator that generates usable steam. A steam turbine receives the usable steam generated by the heat recovery steam generator and exhausts expanded steam at a pressure above atmospheric pressure. The volume of exhausted steam is split, with a portion flowing to the refrigeration element and the balance flowing to an air cooled condenser, where it is condensed and returned to the heat recovery steam generator via a condensate tank. The refrigeration element uses the available energy in the steam as the power source for driving a refrigeration cycle that chills water for use in the inlet chiller. The refrigeration cycle is substantially closed, meaning that cooling water is circulated through the cycle, chilled again, and reused in the inlet chiller rather than being expelled to the atmosphere, as has been the practice in the past. Thus, little or no increase in water usage is imposed on the power plant by the inlet air chiller.

The refrigeration element can either be an absorption chiller system or a thermal compression chiller system, both of which are well suited for cooling a liquid and both of which operate as substantially closed refrigeration cycles. As detailed below, an absorption chilling system generates cooling by using a refrigerant gas and a salt with the cooling cycle being driven by the energy of exhaust steam from the bottoming cycle. In a thermal compression chiller, above-atmospheric pressure steam from the bottoming cycle is provided to the chiller system, where it is expanded rapidly through a steam jet vacuum ejector in communication with an evaporator tank. A vacuum is created in the evaporator tank causing liquid therein to boil, or flash, and thus cool. Water is chilled by the flashing liquid and circulated through the inlet chiller. In both systems, after chilling the inlet air, the now warmed water is returned to the refrigeration element for re-chilling and the process repeats. Selection of the refrigeration element, whether it be an absorption chiller element or a thermal compression element, is not arbitrary. For example, care must be used to ensure the appropriate pressure ratios, i.e. the pressure ratios between a steam jet vacuum ejector inlet, a steam jet vacuum ejector outlet, and the evaporation tank, are established for the thermal compression element to function properly and efficiently. Exhaust from a super-atmospheric steam turbine is required for operation of either refrigeration element to satisfy the inlet air cooling requirements and overall plant water consumption limitations, as disclosed within this specification. The exhausted steam used to power the refrigeration element is condensed and returned to the condensate tank.

Moisture in the ambient atmosphere can condense on external surfaces of the refrigeration element producing potable water as a by-product of the cycle. Because the condensed moisture that develops is available for collection, the quantity of water for use in power plant processes can actually increase in some instances. Thus, power augmentation is now economically and environmentally feasible for a power plant operating in a water restricted arid region by incorporating a refrigeration element as disclosed and there is no need to rely on one of the prohibitive water consuming methods of power augmentation previously discussed, such as evaporative cooling or steam injection.

A method also is disclosed for augmenting the power output of a combined cycle power plant during peak loading. The method includes, but is not limited to, directing a portion of the exhaust of a turbine to a refrigeration element, extracting energy from the exhaust to drive a substantially closed refrigeration cycle to chill a fluid, directing the chilled fluid to an inlet cooler for cooling inlet air, and directing the cooled inlet air to an inlet of a turbine of the power plant to increase mass flow through the turbine and augment a power output.

In yet another aspect, a power plant comprising a Brayton cycle element, a Rankine cycle element, and a refrigeration element is disclosed. The refrigeration element chills a fluid and an inlet chiller receives the chilled fluid to cool inlet air used in the Brayton cycle element. The refrigeration element employs a substantially closed refrigeration cycle to chill the fluid, thus imposing little or not additional water usage requirements on the power plant.

Accordingly, a triple cycle power plant and method is disclosed that addresses successfully the problems and shortcomings of the prior art by providing a means of augmenting the power output of the power plant with little or no increase in the amount of plant water required. The plant and method uses previously wasted exhaust energy to power a substantially closed cycle refrigeration element in which recirculating water is chilled for use in an inlet air chiller. These and other features, objects, and advantages will be better understood upon review of the detailed description presented below taken in conjunction with the accompanying drawing figures, which are briefly described as follows.

BRIEF DESCRIPTION OF THE DRAWINGS

According to common practice, the various features of the drawings discussed below are not necessarily drawn to scale. Dimensions of various features and elements in the drawings may be expanded or reduced to illustrate more clearly the embodiments of the disclosure.

DETAILED DESCRIPTION

Combined cycle power plants are designed to operate over a wide range of conditions, including, for example, a wide range of ambient and operating temperatures that can occur during a typical day, as well daily load swings from a minimal power output requirement to a maximum output requirement. Maximum power output can often be augmented using one of several methods including evaporative cooling of inlet air and steam injection into inlet air as mentioned above. However, these methods require substantial additional un-recovered water, which can be prohibitive especially for plants operating in arid regions where water restrictions or water shortages are in effect. The system detailed below addresses these problems.

Figure 1:
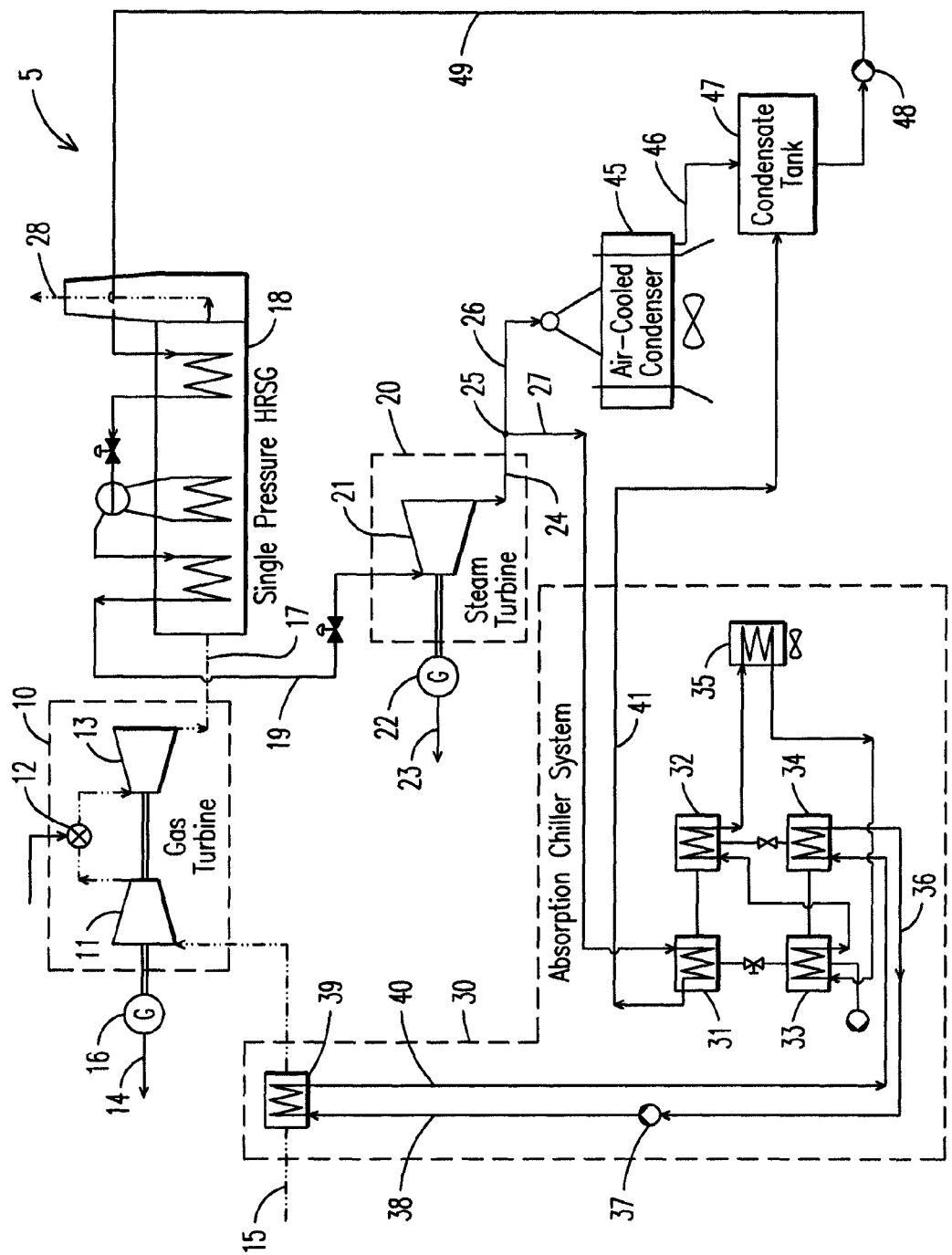
FIG. 1 is a schematic illustration of a combined cycle power plant that embodies an absorption chilling element as the refrigeration element.

Referring now in more detail to the drawing figures, wherein like reference numerals indicate like parts throughout the several views, FIG. 1 is a schematic illustration of a combined cycle power plant according to one embodiment of the invention. The power plant 5 includes a combustion or gas turbine system 10, a steam turbine system 20, and a refrigeration system 30. The gas turbine system 10, or topping cycle, has a compressor 11 for receiving ambient air 15 and producing a flow of compressed air. The compressed air is combined with fuel and combusted in a combustor 12 to produce a flow of hot combustion gas. The hot combustion gas is expanded in a gas turbine 13 to produce mechanical energy for rotating a shaft. The shaft drives both the compressor 11 and an electrical generator 16 that produces electricity 14. The expanded combustion gas 17 exits the gas turbine 13 and is directed to a waste heat recovery boiler 18, also commonly referred to as a heat recovery steam generator or HRSG 18. Additional heat in the expanded combustion gas 17 is removed and usable steam 19 for use within a water-steam cycle of the bottoming cycle is produced by the HRSG 18 before the resulting cooled exhaust gas is exhausted to the atmosphere through an exhaust stack 28.

A steam turbine system 20, or bottoming cycle, receives the usable steam 19 produced by the HRSG 18. The steam is expanded in a steam turbine 21, which also produces mechanical energy for rotating a shaft. The shaft drives an electrical generator 22 that produces electricity 23. The expanded steam 24 exits the steam turbine 21 and is directed to an air cooled condenser 45. The air cooled condenser 45 as disclosed has the advantage of requiring very little plant water for operation and it is recognized that air cooled condensers are environmentally preferable to traditional water cooled condensers for rejecting heat in combined cycle power plants. The expanded steam 24 exits the steam turbine at above atmospheric, or super-atmospheric pressure. A typical value of the exhaust pressure of the super-atmospheric steam can be approximately 16.5 pounds per square inch atmospheric (psia) and the temperature of the steam can be above 200° F. In prior art combined cycle power plants, exhaust steam was ported directly to the air cooled condenser where the energy available in the super-atmospheric steam was discarded.

With continued reference to FIG. 1, a refrigeration element 30 is configured to chill a liquid 36, such as water, and provide the chilled liquid 36 to an inlet chiller 39, which chills inlet air 15 before it is delivered to the compressor 11 of the gas turbine system 10. The refrigeration element 30 is powered by the previously discarded available energy in the exhausted super-atmospheric steam 24. More specifically, exhausted steam 24 exits the steam turbine 21 and is split at a specified location 25, with a portion of the exhaust steam 27 being supplied to the refrigeration element 30 and a portion of the exhaust steam 26 being supplied to the air cooled condenser 45. From the cooled air condenser 45 the water flows to a condensate tank 47 via a condenser-condensate line 46. From the condensate tank 47 the water 48 returns to the HRSG 18 via condensate tank—HRSG line 49. It is desirable that the condenser be an air cooled condenser 45 due to operation in the arid environment since operation of the air cooled condenser 45 is less demanding on plant water. In a power plant 5 utilizing a super-atmospheric turbine 21 and an air cooled condenser 45, the air cooled condenser 45 is typically operated at a steam turbine 21 back pressure greater than 14.7 psia. This pressure is significantly greater than a sub-atmospheric steam turbine operating with an air cooled condenser 45, which generally operates between 1 and 3 psia. As a result of a pressure differential of about 13 psia, there is a loss of about 40 kilo-watts (kW) of unutilized energy for every pound per hour of exhaust 24 from the super-atmospheric steam turbine 21 sent directly to the air cooled condenser 45. With foreseeable shortages of adequate water sources in arid regions and ever increasing regulatory restrictions pertaining to water usage in these regions, an alternative technology, such as extracting previously wasted energy by expanding the exhaust 24 of the super-atmospheric steam turbine 21 from about 15 psia to about 2 psia and using the extracted energy to power the refrigeration element 30 (or the refrigeration element 130 of FIG. 2) to chill inlet air 15 becomes an attractive alternative. Furthermore, when chilling the inlet air 15 below its dew point, the triple cycle power plant 5 will generate plant water from condensate that forms on a plurality of chiller tubes (not shown) of the refrigeration element 30. The amount of exhaust steam supplied to the refrigeration element 30 can depend on the operational requirements of the refrigeration element 30 and can vary depending on overall requirements of the plant 5. Such operational requirements may include, but are not limited to, the size of the refrigeration element 30, the quantity of water to be chilled, and the volume of inlet air to be cooled. The refrigeration element 30 illustrated in FIG. 1 is an absorption chiller system.

The absorption chiller system operates to cool or chill water using water as a refrigerant and an acceptable salt solution, such as lithium bromide, as an absorbent. It is the strong affinity that these two substances have for one another that makes the chilling cycle work, and the entire process occurs in a substantial vacuum. Absorption chiller systems are known in the art, but a brief description of the absorption chiller of FIG. 1 is provided here. Generally, a dilute salt solution is collected in an absorber 33 and pumped to a generator 31. The exhaust steam 27 enters the generator 31 where the steam 27 transfers heat to a pool of the dilute salt solution, causing it to boil. As the dilute salt solution boils, it produces a refrigerant vapor. The refrigerant vapor moves into a condenser 32, leaving behind in the generator 31 a concentrated salt solution. The concentrated salt solution remains in the generator 31 where it is cooled by the dilute salt solution being pumped to the generator 31. The refrigerant vapor condenses on tubes in the condenser 32 as heat is removed by cooling water moving through the condenser 32 within the tubes. Cooling water exits the condenser 32 and is ported to a cooler 35 and returned to the cycle in the absorber 33. The condensed refrigerant moves from the condenser 32 to an evaporator 34. An extreme vacuum is maintained in the evaporator 34, which causes the condensed refrigerant to boil, which, in turn, creates the refrigeration effect as the refrigerant is passed over an evaporator tube bundle. The vacuum in evaporator 34 is created and maintained by hygroscopic action, which is the strong affinity the salt solution has for water located in the absorber 33. As the refrigerant vapor migrates to the absorber 33 from the evaporator 34, the strong salt solution from the generator 31 is sprayed over an absorber tube bundle. The strong salt solution actually pulls the refrigerant vapor into solution, creating and maintaining the extreme vacuum in the evaporator 33. The absorption of the refrigerant vapor into the solution also generates heat which is removed by the cooling water supplied from the cooler 35 and sent to the condenser 32. The now dilute salt solution is pumped back to the generator 31, completing the absorption chilling cycle. If necessary, more than one absorption chiller system can be incorporated within the refrigeration element 30 and cooling can occur in several stages.

Water that is used to cool inlet air to the compressor 11 by circulating through the inlet chiller 39 is chilled as it is circulated through a heat exchanger within the evaporator 34, where refrigeration occurs. The chilled water 37 is circulated to the inlet chiller 39, where it chills inlet air and is warmed in the process. The warmed water 40 is then returned to the evaporator 34 for re-chilling in a substantially closed and repeating cycle.

The absorption chiller system advantageously uses the heat within exhausted steam 27 to chill water 38 supplied to the inlet chiller 39, which, in turn, cools inlet air 15. When power augmentation is required and ambient conditions are acceptable, at, for instance, an ambient temperature of 80° F., the refrigeration element 30 can be used to chill water 38 for use in the inlet chiller 39. By doing so, the inlet air 15 is cooled, increasing the density of the air 15 and thus the mass flow through the combustion turbine system 10 to increase power output 14. Furthermore, the absorption chiller system used in this embodiment of the refrigeration element 30, as disclosed, is a substantially closed system and thus imposes little or no additional water requirement on the plant 5 during periods of output augmentation.

Figure 2:
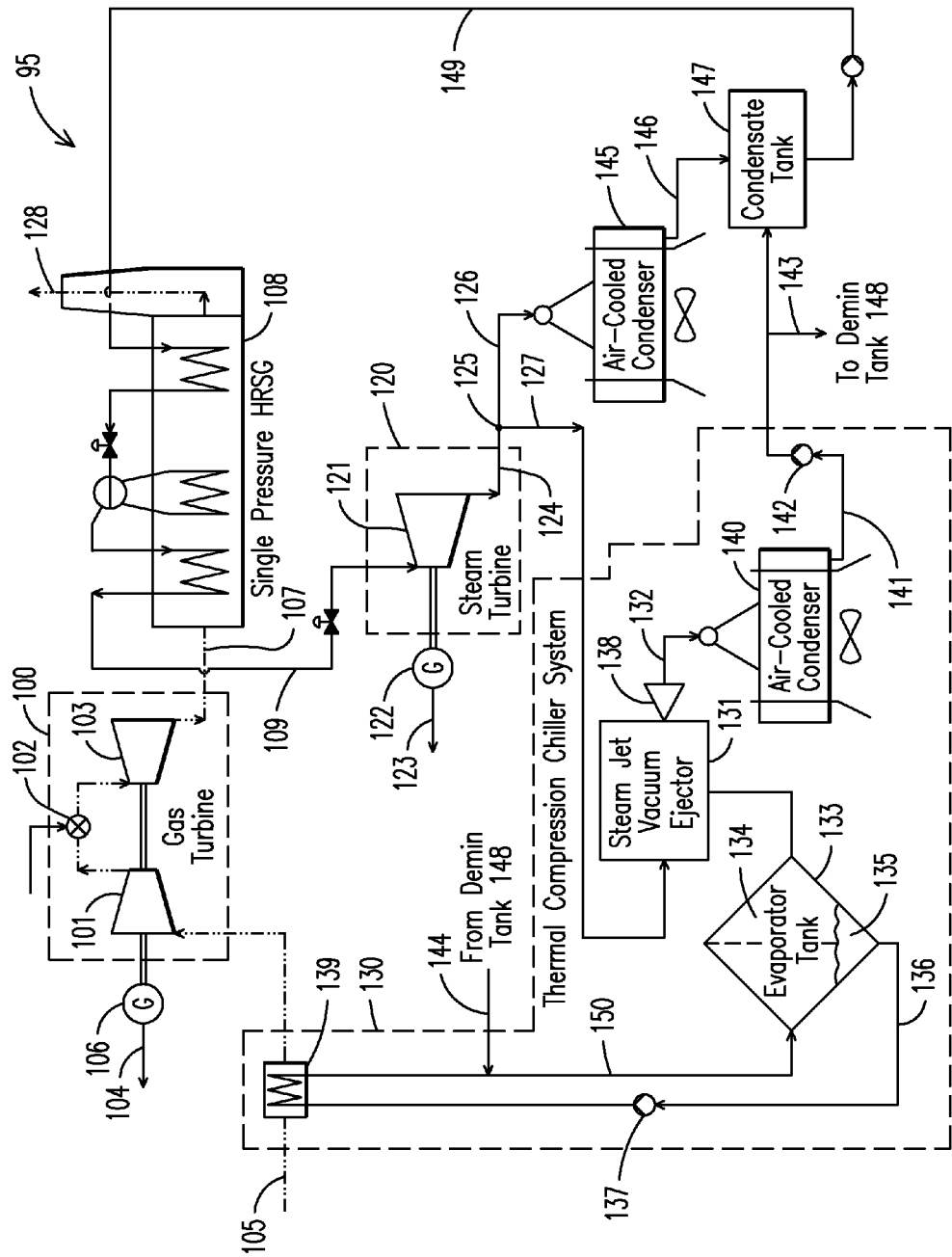
FIG. 2 is a schematic illustration of a combined cycle power plant that embodies a thermal compression element as the refrigeration element.

Turning now to FIG. 2, a schematic diagram illustrating an alternate embodiment of a combined cycle power plant 95 is illustrated. As with FIG. 1, the combined cycle power plant 95 includes a gas turbine system 100, a steam turbine system 120, and a refrigeration system 130. The gas turbine system 100 has a compressor 101 for receiving ambient air 105 and producing a flow of compressed air. The compressed air is combined with fuel and combusted in a combustor 102 to produce a flow of hot combustion gas. The hot combustion gas is expanded in a gas turbine 103 to produce mechanical energy for rotating a shaft. The shaft drives both the compressor 101 and an electrical generator 106 that produces electricity 104. The expanded combustion gas 107 exits the gas turbine 103 and is directed to a waste heat recovery boiler 108, also commonly referred to as a heat recovery steam generator or HRSG 108. Additional heat is removed and usable steam 109 is produced from the expanded combustion gas 107 by the HRSG 108 before the cooled exhaust gas is exhausted to the atmosphere through an exhaust stack 128.

The steam turbine system 120 receives the usable steam 109 produced by the HRSG 108 and the steam is expanded in a steam turbine 121, which also produces mechanical energy for rotating a shaft. The shaft drives an electrical generator 122 that produces electricity 123. The expanded steam 124 exits the steam turbine 121 and is directed to an air cooled condenser 145. The expanded steam 124 exits the steam turbine at above atmospheric pressure. From the air cooled condenser 145 the water travels to the condensate tank 147 via condenser-condensate tank line 146. The water returns to the HRSG 108 via condensate tank-HRSG line 149.

Exhausted steam 124 exits the steam turbine 121 and is split at a specified location 125, with a portion of the exhaust steam 127 being supplied to a refrigeration element 130 and a portion of the exhaust steam 26 being supplied to the air cooled condenser 45. The refrigeration element 130 illustrated in FIG. 2 is a thermal compression chiller system. As with the absorption chiller of FIG. 1, the thermal compression chiller uses the rejected energy from the bottoming cycle as a source of power. However, the thermal compression chiller must have super-atmospheric exhaust steam 127 to operate, whereas the absorption chiller of FIG. 1 can operate with sub-atmospheric, atmospheric, or super-atmospheric exhaust steam.

The thermal compression chiller system 130 chills water 137 that is supplied to an inlet chiller 139 in the following manner. Super-atmospheric exhaust steam 127 is supplied to a steam jet vacuum ejector 131. The steam jet vacuum ejector 131 receives the steam 127, passing the motive steam 127 through an expanding nozzle. The nozzle creates a controlled expansion of the steam to convert the pressure of the super-atmospheric steam 127 into velocity of a steam jet. The steam jet vacuum ejector is in fluid communication with an evaporator tank 133, which contains water 135 within its base. The increase in velocity of the super-atmospheric steam 127 creates a low pressure zone 134, or vacuum, within the evaporator tank 133. The vacuum 134 is sufficient to cause the water 135 to boil, or flash, and undergo a state change to become water vapor. The flashing has the effect of chilling the water 135 in the evaporator tank 133.

The motive steam 127 and water vapor are mixed and exhausted through a diffuser 138 with the mixture of water and water vapor 132 leaving the diffuser and being supplied to an air cooled condenser 140. Chilled water 136 exits the evaporator tank 133 and is moved by pump 137 to the inlet chiller 139, where it absorbs heat from and thus chills inlet air 105. Once through the inlet chiller 139, the now warmed water 150 is returned to the evaporator tank 134 to be re-chilled by the thermal compression cycle. After the water and water vapor mixture is condensed in the air cooled condenser 140, water 141 leaves the air cooled condenser 140 and is supplied to a condensate tank 147. Water is pumped from the condensate tank 147 to the HRSG 108. Since a portion of the water 135 in the evaporator tank 133 is lost to evaporation, a portion of water 143 from the condensed water supply 141 is extracted and supplied to a demineralization tank 148. Water 144 from the demineralization tank 148 is supplied to water leaving the inlet chiller 139 to replace the water lost during evaporation in the evaporator tank 133. As with the absorption chiller system illustrated in FIG. 1, the thermal compression chiller system employs a substantially closed refrigeration cycle and thus requires little or no additional plant water for operation. It too, therefore, is an attractive means of augmenting the power output of the combined cycle power plant 95 particularly in arid or water restricted locations.

Figure 3:
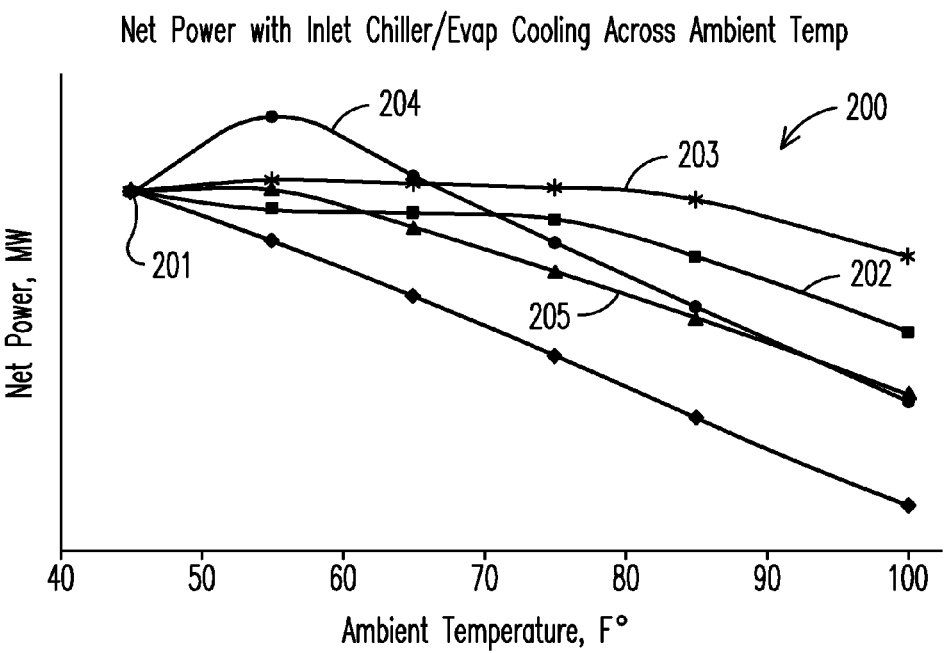
FIG. 3 is a graph that represents the net power augmentation as a function of ambient temperature for a combined cycle power plant incorporating chilling inlet air using absorption cooling according to the invention, chilling inlet air using thermal compression according to the invention, chilling the inlet air by evaporative cooling, and injecting steam into the flow of inlet air.

FIG. 3 is a comparative graphical representation illustrating net power increase that occurs during a power augmentation mode when absorption chilling, chilling via thermal compression, and traditional evaporative cooling respectively are used to chill the inlet air to the combustion turbine system, as well as the net power increase that occurs when steam is injected into the flow path of the combustion turbine system. The graph 200 represents net power output (MW) as a function of ambient temperature (F). The baseline power 201 with no power augmentation is seen as a downwardly sloping line, indicating that as ambient temperature increases, net power output decreases. This is due primarily to the fact that as ambient temperature increases, the density of the inlet air will decrease thereby reducing the mass flow through the combustion turbine system. Curve 202 represents the increase in net power output when absorption chilling as illustrated in FIG. 1 is used as the refrigeration element to chill the inlet air to the topping cycle. Curve 203 represents the increase in net power output when thermal compression chilling according to FIG. 2 is used as the refrigeration element to chill the inlet air to the topping cycle. Curve 204 illustrates the increase in net power output using steam injection techniques. Curve 205 represents the net power output when inlet air to the compressor is cooled using traditional evaporative cooling.

It is noted in the graph 200 that each of the methods shown offer an increase in net power output over the baseline of no power augmentation. However, on a warm day (i.e. ambient temperature above 70° F.), cooling the inlet air by absorption chilling (curve 202) and cooling the inlet air by thermal compression chilling (curve 203) provide more net power output than power augmentation by steam injection (curve 205). On a less warm day (i.e. ambient temperature above 60° F.), cooling by absorption chilling (curve 202) and cooling by thermal compression chilling (curve 203) provides superior net power output when compared to cooling the inlet air using traditional evaporative cooling (curve 205). While curve 204, power augmentation by steam injection, does show superior improvement in net power output on cool days, the combined cycle power plant as disclosed is particularly suited for use in arid regions, particularly the Southwest United States, where temperatures are routinely on the higher end of the graph 200.

Figure 4:
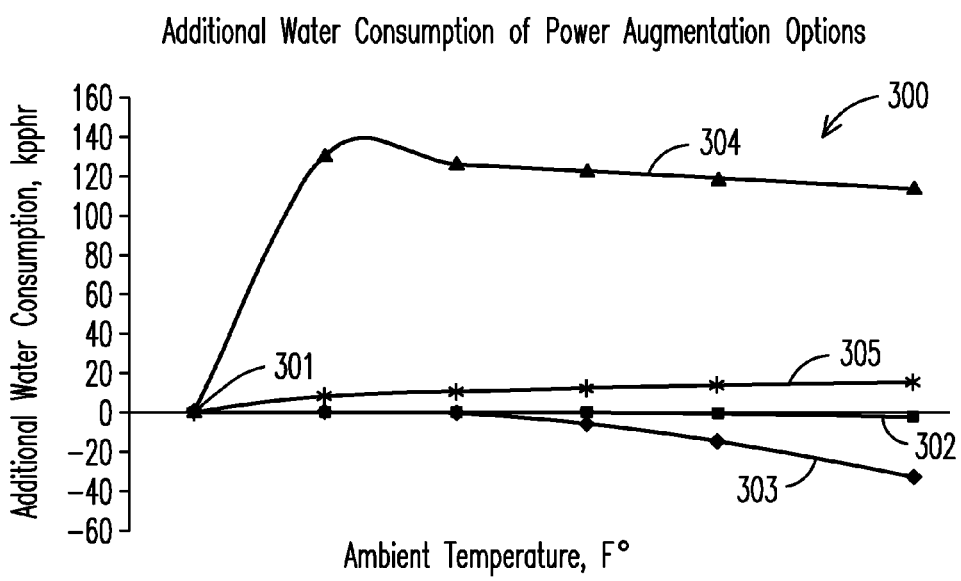
FIG. 4 is a graph that represents additional plant water consumption as a function of ambient temperature for a combined cycle power plant incorporating chilling the inlet air by absorption cooling according to the invention, chilling the inlet air by thermal compression according to the invention, chilling inlet air by evaporative cooling, and injecting steam into the flow of inlet air.

FIG. 4 is a comparative graphical representation of the additional water usage that occurs during a power augmentation mode when absorption chilling, chilling via thermal compression, and traditional evaporative cooling are used to chill the inlet air to the combustion turbine system, as well as water consumption when steam is injected into the flow path of the combustion turbine system. Graph 300 shows a comparison of the additional water consumption as a function of ambient temperature (F) with the various power augmentation options. The baseline water usage 301 with no power augmentation is seen as a horizontal line extending substantially parallel to the abscissa, indicating little or no additional plant water usage when power output is not augmented. Curve 302 represents the increase in plant water consumption when absorption chilling according to FIG. 1 is used as the refrigeration element to chill the inlet air to the compressor. Curve 303 represents the increase in plant water consumption when thermal compression chilling according to FIG. 2 is used as the refrigeration element to chill the inlet air to the compressor. Curve 304 shows the increase in plant water consumption using steam injection is implemented. Curve 305 represents the increase in plant water consumption when inlet air to the compressor is cooled using traditional evaporative cooling.

It can be seen that curve 302 shows that there is almost no increase in the amount of plant water necessary to cool gas turbine inlet air using absorption chilling and curve 303, cooling by thermal compression chilling, actually shows a net decrease in the amount of plant water necessary to operate the thermal compression chiller. This is because there is a substantial quantity of potable water produced by the thermal compression process through condensation from the atmosphere. Additional water consumption using steam injection, illustrated as curve 304, and using evaporative cooling, illustrated as curve 305, clearly can be significant.

As mentioned, potable water is a by-product of the refrigeration system of either FIG. 1 or 2. The potable water results from moisture condensing from the ambient air and forming on components of the refrigeration. This moisture, essentially distilled water, is available for collection and use.

Accordingly, a triple cycle, combined cycle power plant that includes a refrigeration element powered by previously discharged energy is now provided. As inlet air to the gas turbine is cooled to increase power output, a much more economical and ecological method of cooling the inlet air is achieved. Instead of wasting usable energy in exhausted steam in the bottoming cycle, a refrigeration process can be powered by the energy in the exhausted steam and used to cool inlet air an inlet chiller before the air is directed to the gas turbine system. Additionally, the refrigeration process requires little or no additional plant water, and has the added advantage of actually producing potable water as a by-product, thereby making the entire process superior to prior art systems particularly for power plants in arid or water restricted regions.

The invention has been described herein in terms of preferred embodiments and methodologies considered to represent the best mode of carrying out the invention. However, the invention should not be construed to be limited by the illustrated embodiments. In fact, a wide variety of additions, deletions, and modifications might well be made to the illustrated embodiments without departing from the spirit and scope of the invention as set forth in the claims.

What is claimed is:

1. A power plant, comprising:
a combustion turbine system having an inlet receiving inlet air and exhausting expanded combustion gas, the combustion turbine system coupled to an electric generator;
an inlet chiller for chilling inlet air before the air is received by the inlet of the combustion turbine system to augment a power output of the power plant;
a heat recovery steam generator for receiving the expanded combustion gas and extracting heat therefrom to produce usable steam within a water-steam cycle;
a steam turbine system coupled to an electric generator, the steam turbine system receiving the usable steam from the heat recovery steam generator and exhausting steam at super-atmospheric pressure; and
a refrigeration element configured to receive at least a portion of the exhausted steam from the steam turbine and to extract energy from the exhausted steam to drive a substantially closed refrigeration cycle that chills a fluid, wherein the chilled fluid is circulated through the inlet chiller to chill inlet air, and
a collection and delivery system configured to collect water that has condensed on the refrigeration element and deliver the collected water to the water-steam cycle.

2. A power plant as claimed in claim 1, wherein the refrigeration cycle comprises an absorption chiller cycle.

3. A power plant as claimed in claim 2, wherein the absorption chiller cycle comprises a generator for extracting heat from the received steam to boil a salt solution and produce a refrigerant vapor.

4. A power plant as claimed in claim 3, wherein the absorption chiller cycle further comprises a condenser configured to receive a refrigerant vapor and condense the vapor to a refrigerant liquid.

5. A power plant as claimed in claim 4, wherein the absorption chiller cycle further comprises an evaporator configured to receive the refrigerant liquid and to vacuum evaporate the liquid, the evaporating liquid cooling the chilled fluid.

6. A power plant as claimed in claim 5, wherein the absorption chiller cycle further comprises an absorber configured to return a dilute salt solution back to the generator and complete the cycle.

7. A power plant as claimed in claim 1, wherein the refrigeration cycle is a thermal compression cycle.

8. A power plant as claimed in claim 7, wherein the thermal compression cycle comprises a steam jet vacuum ejector for extracting energy from the exhausted steam at super-atmospheric pressure.

9. A power plant as claimed in claim 8, wherein a velocity of the exhausted steam is increased as the exhausted steam flows through the steam jet vacuum ejector.

10. A power plant as claimed in claim 9, wherein the thermal compression cycle further comprises the fluid in an evaporator tank, the evaporator tank in communication with the steam jet vacuum ejector.

11. A power plant as claimed in claim 10, wherein a vacuum is created and maintained in the evaporator tank by the increased velocity of the exhausted steam, the vacuum causing a portion of the fluid to flash and undergo a state change to a vapor.

12. A power plant as claimed in claim 11, wherein the flashing of the fluid in the evaporator tank chills the remaining fluid.

13. A power plant as claimed in claim 12, wherein the steam jet ejector comprises a diffuser through which the exhausted steam expands and is exhausted.

14. A power plant as claimed in claim 1, wherein potable water is extracted from a plurality of external surfaces of the refrigeration element.

15. A method of augmenting power production of a power plant having a turbine combustion system that provides combustion gas to a heat recovery steam generator to produce usable steam within a water-steam cycle and a steam turbine that receives the steam from the heat recovery steam generator, the method comprising the steps of:
(a) directing a portion of an exhaust steam from the steam turbine to a refrigeration element;
(b) extracting energy from the exhaust steam in the refrigeration element to drive a substantially closed refrigeration cycle to chill a fluid;
(c) directing the chilled fluid to an inlet cooler for cooling inlet air; and
(d) directing the cooled inlet air to an inlet of the turbine combustion system of the power plant to augment a power output and delivering water that has condensed on the refrigeration element to the water-steam cycle.

16. The method of claim 15, wherein the steam turbine of step (a) is a super-atmospheric steam turbine.

17. The method of claim 15, where in step (b) the substantially closed refrigeration cycle comprises either an absorption chiller cycle or a thermal compression cycle.

18. A power plant operating in an arid environment comprising:
- a Brayton cycle element providing combustion gas to a heat recovery steam generator;
- a Rankine cycle element comprising a steam turbine system receiving steam of a water-steam cycle from the heat recovery steam generator and exhausting steam at super-atmospheric pressure,
- a refrigeration element chilling a fluid, the refrigeration element for receiving the steam from the steam turbine system and extracting energy from the steam at super-atmospheric pressure, and
- an inlet chiller receiving the chilled fluid to cool inlet air used in the Brayton cycle element, and
- a collection and delivery system configured to collect water that has condensed on the refrigeration element and deliver the water to the water-steam cycle.

19. The power plant of claim 18, wherein the refrigeration cycle is substantially closed.

* * * * *